US009379960B2

(12) United States Patent
Ihm et al.

(10) Patent No.: US 9,379,960 B2
(45) Date of Patent: Jun. 28, 2016

(54) METHOD AND APPARATUS FOR CHANNEL ESTIMATION IN A DISTRIBUTED MULTI-NODE SYSTEM

(75) Inventors: Bin Chul Ihm, Anyang-si (KR); Ki Tae Kim, Anyang-si (KR); Su Nam Kim, Anyang-si (KR); Ji Won Kang, Anyang-si (KR); Jin Young Chun, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 14/343,669

(22) PCT Filed: Sep. 7, 2012

(86) PCT No.: PCT/KR2012/007203
§ 371 (c)(1),
(2), (4) Date: Mar. 17, 2014

(87) PCT Pub. No.: WO2013/036058
PCT Pub. Date: Mar. 14, 2013

(65) Prior Publication Data
US 2014/0198683 A1 Jul. 17, 2014

Related U.S. Application Data

(60) Provisional application No. 61/532,576, filed on Sep. 9, 2011.

(51) Int. Cl.
H04L 12/26 (2006.01)
H04B 7/04 (2006.01)
(Continued)

(52) U.S. Cl.
CPC .............. *H04L 43/50* (2013.01); *H04B 7/0417* (2013.01); *H04L 25/0224* (2013.01); *H04B 7/063* (2013.01); *H04B 7/0632* (2013.01); *H04B 7/0639* (2013.01)

(58) Field of Classification Search
CPC .............................. H04L 43/50; H04B 7/0417
USPC .......... 370/252, 208, 311, 329, 331; 455/522, 455/452.2, 456.1, 456.6, 550.1; 375/260, 375/224
See application file for complete search history.

(56) References Cited

U.S. PATENT DOCUMENTS 8,965,414 B2 * 2/2015 Siomina et al. ............ 455/456.6
2004/0166886 A1 * 8/2004 Laroia et al. .................. 455/522
(Continued)

OTHER PUBLICATIONS

U.S. Appl. No. 61/523,278 specification and Drawing documents, filed Aug. 12, 2011 Lee et al.*
CATT, 3GPP TSG RAN WG1 Meeting #66, R1-112110, "Considerations on Interference Measurement and its Specification Impact in CoMP", CATT, Athens Greece, Aug. 22-26, 2011.
(Continued)

*Primary Examiner* — Parth Patel
(74) *Attorney, Agent, or Firm* — Dentons US LLP

(57) ABSTRACT

Disclosed are a method and an apparatus for channel estimation in a multi-node distributed system. A method for channel state estimation comprises the steps of: a terminal receiving channel state information reference signal (CSI-RS) set-up information; and the terminal calculating interference on the basis of the CSI-RS set-up information and then transmitting channel state information (CSI) based on the interference, wherein the CSI-RS set-up information may include at least one of an external interference measurement field and an internal interference measurement field. Accordingly, during the external interference and internal interference measurements, the node for use in the interference measurements may be controlled by a base station so that interference is accurately measured and feedback of accurate channel information is enabled.

8 Claims, 10 Drawing Sheets

(51) Int. Cl.
*H04L 25/02* (2006.01)
*H04B 7/06* (2006.01)

(56) References Cited

U.S. PATENT DOCUMENTS

| | | | |
|---|---|---|---|
| 2009/0005102 A1* | 1/2009 | Das et al. ....................... | 455/522 |
| 2009/0111506 A1* | 4/2009 | Laroia et al. ................ | 455/550.1 |
| 2011/0103282 A1* | 5/2011 | Jeon et al. ..................... | 370/311 |
| 2011/0176634 A1 | 7/2011 | Yoon et al. | |
| 2011/0273977 A1* | 11/2011 | Shapira et al. ................. | 370/208 |
| 2012/0208547 A1* | 8/2012 | Geirhofer et al. .......... | 455/452.2 |
| 2012/0213261 A1* | 8/2012 | Sayana et al. ................. | 375/224 |
| 2012/0315859 A1* | 12/2012 | Lee et al. .................... | 455/67.13 |
| 2013/0208604 A1* | 8/2013 | Lee et al. ...................... | 370/252 |
| 2014/0321407 A1* | 10/2014 | Seo et al. ...................... | 370/329 |

OTHER PUBLICATIONS

NTT DOCOMO, 3GPP TSG RAN WG2 Meeting #62bis, R2-110115, "Higher layer signaling of CSI-RS and muting configurations" Dublin, Ireland, Jan. 17-2, 2011.

LG Electronics, 3GPP TSG RAN WG1 Meeting #65, R1-111788, "Discussion on CSI feedback enhancement", Barcelona Spain, May 9-13, 2011.

Nokia Siemens Network, 3GPP TSG RAN WG2 Meeting #62bis, R2-110160, "Incorporaqting agreed Rel-10L1 parameters in RRC", Dublin Ireland Jan. 17-21, 2011.

Samsung,3GPP TSG RAN WG1 #66, R1-112513, "Summary of e-mail discussion on specification impacts of CoMP", Athens, Greece, Aug. 22-26, 2011.

* cited by examiner

US 9,379,960 B2

METHOD AND APPARATUS FOR CHANNEL ESTIMATION IN A DISTRIBUTED MULTI-NODE SYSTEM

This application is a 35 USC §371 National Stage entry of International Application No. PCT/KR2012/007203, filed on Sep. 7, 2012, and claims priority of U.S. Provisional Application No. 61/532,576 filed Sep. 9, 2011 which are each hereby incorporated by reference in its entirety.

TECHNICAL FIELD

The present invention relates to wireless communication and, more particularly, to a method and apparatus for estimating a channel in a multi-node distributed system.

BACKGROUND ART

The data transfer rate over a wireless communication network is recently increasing rapidly. This results from the appearance and spread of a variety of devices, such as smart phones and tablet PCs which require Machine-to-Machine (M2M) communication and a high data transfer rate. In order to meet a necessary high data transfer rate, carrier aggregation technology in which more frequency bands are efficiently used, cognitive radio, and multiple antenna technology and multiple base station cooperation technology in order to increase a data capacity in a limited frequency, etc. are recently emerging.

Furthermore, a wireless communication network is evolving into an increase in the density of accessible nodes around a user. Here, the nodes mean antennas or a group of antennas that are spaced apart from one another at specific intervals in a Distributed Antenna System (DAS). However, the nodes are not limited to the meaning, but may be used as a broader sense. That is, the node may be a pico-cell eNodeB (PeNB), a home eNodeB (HeNB), a Remote Radio Head (RRH), a Remote Radio Unit (RRU), a relay or the like. A wireless communication system including such nodes having a high density may show better system performance through cooperation between the nodes. That is, if each of the nodes operates as an independent base station (i.e., a Base Station (BS), an Advanced BS (ABS), a Node-B (NB), an eNode-B (eNB), or an Access Point (AP)), the transmission and reception of each node are managed by one control station, and thus the nodes operates like antennas or a group of antennas for one cell, the nodes may show much excellent system performance as compared with a case where the nodes do not cooperate with each other. A wireless communication system including a plurality of nodes is hereinafter called a multi-node system.

In general, a node may be applied to a group of antennas spaced apart from one another at specific intervals or higher and also to a specific antenna group irrespective of the interval although it is defined as the specific antenna group. For example, a BS formed of cross-polarized antennas may be considered to include a node formed of an H-pol antenna and a node formed of a V-pol antenna.

In a multi-node system, a node for sending a signal to a terminal (or user equipment (UE)) may be different every terminal, and a plurality of nodes may be configured. Here, each node may send a different reference signal. In such a case, the terminal can measure a channel state for a relation between each node and the terminal using a plurality of reference signals and can feed back channel state information periodically or aperiodically.

DISCLOSURE

Technical Problem

An object of the present invention is to provide a method of estimating a channel in a multi-node system.

Another object of the present invention is to provide an apparatus for performing a method of estimating a channel in a multi-node system.

Technical Solution

A method of measuring a channel state according to an aspect of the present invention for achieving the objects of the present invention includes steps of receiving, by a terminal (or user equipment (UE)), Channel State Information-Reference Signal (CSI-RS) configuration information and calculating, by the terminal, an amount of interference based on the CSI-RS configuration information and sending Channel State Information (CSI) based on the amount of interference, wherein the CSI-RS configuration information may include at least one of an external interference measurement field including information about a zero power CSI-RS that is used for the terminal to compute external interference and an internal interference measurement field including information about a non-zero power CSI-RS that is used for the terminal to compute internal interference, and the zero power CSI-RS may be a CSI-RS in which an energy value of a resource element is 0. The external interference measurement field may be a field including information about a node that sends the zero power CSI-RS used to measure the external interference. The method of measuring a channel state may further include a step of calculating the amount of interference using the zero power CSI-RS derived based on the external interference measurement field. The internal interference measurement field may be a field including information about a node that sends the non-zero power CSI-RS used to measure the internal interference. The method of measuring a channel state may further include a step of calculating the amount of interference using the non-zero power CSI-RS derived based on the internal interference measurement field. The method of measuring a channel state may further include a step of calculating the amount of interference using the zero power CSI-RS derived based on the external interference measurement field.

A terminal according to an aspect of the present invention for achieving the objects of the present invention includes a processor calculating an amount of interference based on received Channel State Information-Reference Signal (CSI-RS) configuration information and computing Channel State Information (CSI) based on the amount of interference and a transceiver sending the Channel State Information (CSI) based on the amount of interference, wherein the CSI-RS configuration information may include at least one of an external interference measurement field including information about a zero power CSI-RS that is used for the terminal to compute external interference and an internal interference measurement field including information about a non-zero power CSI-RS that is used for the terminal to compute internal interference, and the zero power CSI-RS may be a CSI-RS in which an energy value of a resource element is 0. The external interference measurement field may be a field including information about a node that sends the zero power CSI-RS used to measure the external interference. The processor may calculate the amount of interference using the zero power CSI-RS derived based on the external interference measurement field. The internal interference measurement field may be a field including information about a node that sends the non-zero power CSI-RS used to measure the internal interference. The processor may calculate the amount of interference using the non-zero power CSI-RS derived based on the internal interference measurement field. The processor may calculate the amount of interference using the zero power CSI-RS derived based on the external interference measurement field.

Advantageous Effects

In accordance with the method and apparatus for estimating a channel in a multi-node distributed system in accordance with embodiments of the present invention, in measuring external interference and internal interference, the amount of interference can be accurately measured because a BS controls a node used for interference measurement, and accurate channel information can be fed back.

MODE FOR INVENTION

The following technology can be used in various types of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA).

CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of comprising steps of:

a Universal Mobile Telecommunications System (UMTS). 3$^{rd}$ Generation Partnership Project (3GPP) Long Term Evolution (LTE) is part of an Evolved UMTS (E-UMTS) using E-UTRA. 3GPP LTE adopts OFDMA in downlink and adopts SC-FDMA in uplink. LTE-Advanced (A) is the evolution of 3GPP LTE.

Figure 1:
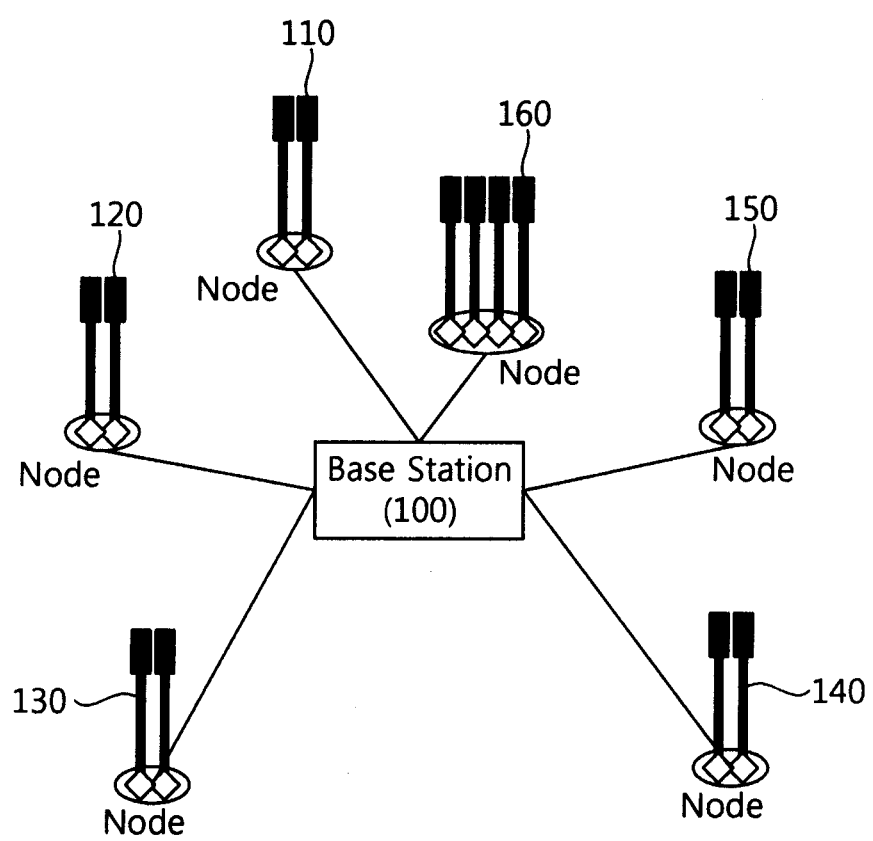
FIG. 1 is a conceptual diagram showing a single cell multi-node distributed system.

FIG. 1 is a conceptual diagram showing a single cell multi-node distributed system.

Referring to FIG. 1, in the single cell multi-node distributed system, the transmission and reception of each of nodes 110, 120, 130, 140, 150, and 160 can be managed by one BS controller 100, and thus each node may operate like part of one cell.

A node in an embodiment of the present invention commonly refers to a group of antennas (may physically correspond to a Remote Radio Head (RRH), or a Remote Radio Unit (RRU)) spaced apart from one another at specific intervals in a Distributed Antenna System (DAS). In the present invention, however, a node may be interpreted as a specific antenna group irrespective of a physical interval. For example, in an embodiment of the present invention, a BS formed of cross-polarized antennas may be considered to include a node formed of an H-pol antenna and a node formed of a V-pol antenna. A node may become a BS, such as a picocell BS (PeNB) or a home BS (HeNB), not an antenna group.

Furthermore, a 'node' in the present invention is not limited to a 'node from a physical viewpoint', but may be extended to and interpreted as a 'node from logical viewpoint'. The 'node from a logical viewpoint' means a transmission pilot signal that is recognized as a node from a viewpoint of a terminal (or user equipment (UE)). For example, an LTE terminal can recognize information about the configuration of a node through a Cell-specific Reference Signal (CRS) or a Channel State Information-Reference Signal (CSI-RS) port(s). Accordingly, logically, a node recognized by the terminal may be different from an actual physical node. For example, in a cell in which N CRS ports are transmitted, an LTE terminal may recognize that the cell is formed of one node including N transmission antennas. However, the configuration of physical nodes of the cell may be various. For example, two nodes within a cell may send every N/2 CRS ports. For another example, a plurality of nodes having N transmission antennas may send N CRS ports in a single Frequency Network (SFN) style.

As a result, a terminal can recognize a node from a logical viewpoint and perform transmission and reception processing because a relationship between a physical node and a logical node may be transparent from the terminal's viewpoint. In an LTE-A system, a logical node may be recognized as one CSI-RS resource (or pattern). For example, if a plurality of CSI-RS resources is configured for a terminal, the terminal may recognize each CSI-RS resource as one logical node and perform transmission and reception processing.

An antenna to be described in an embodiment of the present invention may be replaced with an antenna port, a virtual antenna, or an antenna group as well as a physical antenna.

In a multi-node distributed system, a terminal has to perform coherent demodulation on various types of downlink physical channels. In order for the terminal to perform coherent demodulation, a downlink channel needs to be estimated. In order for the terminal to estimate the downlink channel, the downlink channel can be estimated by inserting a reference symbol, known to the terminal, into a time-frequency lattice (or a resource grid) of ODFM. Such a reference symbol may be called a downlink reference symbol or a reference symbol. The following reference symbols may be used as the reference symbol.

(1) A Cell-specific Reference Signal (CRS) is transmitted in each downlink subframe and all resource blocks and can cover all cell bandwidths. If transmission mode is 7, 8, or 9, the CRS can be used as a reference signal for the coherent demodulation of a signal that is transmitted through a physical channel other than a physical multicast channel (PMCH) and a physical downlink shared channel (PDSCH). If transmission mode is 7, 8, or 9, it refers to a case where non-codebook-based precoding is performed.

Furthermore, the CRS may be used for a terminal to obtain Channel State Information (CSI), and the terminal can determine whether or not to select a cell or to perform handover based on the CRS.

(2) A demodulation reference signal (DM-RS) may also be defined as a term 'UE-specific reference signal'. If transmission mode is 7, 8, or 9, the DM-RS may be used for a terminal to perform channel measurement on a physical downlink shared channel (PDSCH). The term 'UE-specific' means that each demodulation reference signal (DM-RS) is used for channel measurement by one terminal. That is, the DM-RS can be transmitted through a resource block that is transmitted to a specific terminal through a PDSCH.

(3) A CSI Reference Signal (CSI-RS) refers to a reference signal used to obtain Channel State Information (CSI). The CSI-RS has lower overhead than the aforementioned CRS because it has a very low time/frequency density.

(4) An MBSFN reference signal is used for channel measurement for coherent demodulation in the transmission of a multicast channel (MCH) that uses a Multicast-Broadcast Single Frequency Network (MBSFN).

(5) A positioning reference signal is a reference signal used to improve LTE positioning functionality. In order to measure the geographical position of a terminal, a plurality of LTE cells may use the positioning reference signal to measure the terminal. If a positioning reference signal in a specific cell is used in the empty resource element position of a neighboring cell, a high Signal to Interference Ratio (SIR) can be obtained.

Hereinafter, an embodiment of the present invention discloses a method of performing channel estimation using a CSI-RS in a multi-node distributed system.

Figure 2:
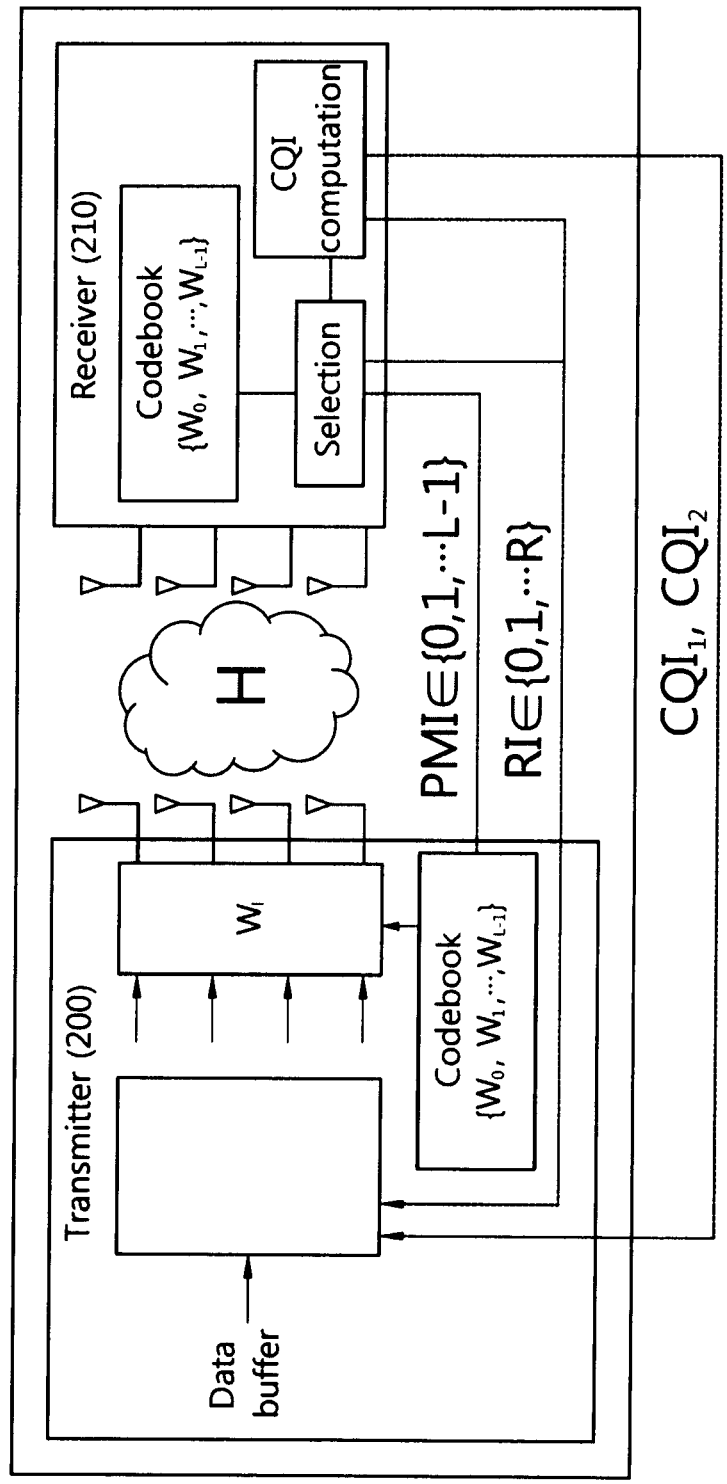
FIG. 2 is a conceptual diagram showing the transmission of a CSI-RS and the feedback of CSI measured by a terminal.

FIG. 2 is a conceptual diagram showing the transmission of a CSI-RS and the feedback of CSI measured by a terminal.

Referring to FIG. 2, a receiver 210 can feed channel information, obtained based on a CSI-RS transmitted by a transmitter 200, back to the transmitter 200 using parameters, such as a Rank Index (RI), a Precoding Matrix Index (PMI), and a Channel Quality Indicator (CQI). The parameters indicative of channel information, such as the RI, the PMI, or the CQI, may be called Channel State Information (CSI).

(1) The Rank Index (RI) provides the transmitter 200 with recommendation for a transmission rank to be used. That is, information about the number of layers used in downlink transmission can be provided to the transmitter.

(2) The Precoding Matrix Index (PMI) can be used as a value indicative of a precoder matrix that is used in downlink transmission. The precoder matrix can be determined by estimating the number of layers indicated by an RI.

(3) The Channel Quality Indicator (CQI) can provide the transmitter 200 with information about the highest modulation coding scheme.

The receiver 210 can report a channel state by sending an RI, a PMI, and a CQI, that is, pieces of information indicative of a channel state as described above, as feedback information about the CSI-RS received from the transmitter 200.

Since the aforementioned CRS is also a reference signal that may be used to obtain channel state information, the role of the CRS may be overlapped with the role of the CSI-RS. The CSI-RS may be used to supplement the CRS, that is, a reference signal that is already present for the following two reasons.

(1) In LTE release 8, a maximum of 4 reference signals may be present in one cell. In contrast, in LTE release 10, downlink spatial multiplexing is possible up to 8 layers because 8 transmission antennas are supported in one base station. For this reason, the CSI-RS may be used as a reference signal for extending CSI capabilities rather than the CRS, that is, a reference signal already used in LTE release 8.

(2) The CRS that is already used has a high time-frequency density because it has been set so that channel measurement is performed in a channel situation that varies very rapidly. Accordingly, the CRS acts as high overhead. In contrast, the CSI-RS has a low time-frequency density and relatively lower overhead than the CRS because the CSI-RS is a reference signal that has been targeted on only CSI. Accordingly, a CSI-RS having a low time-frequency density and low overhead may be defined and used as a new type of a reference signal instead of extending the CRS, that is, an existing reference signal.

One cell may use 1, 2, 4, or 8 CSI-RSs in each resource block pair. In the resource grid, a CSI-RS structure (or a CSI-RS configuration) indicative of a structure in which CSI-RSs are disposed may have a different CSI-RS structure depending on the number of CSI-RSs used in one cell. For example, if one CSI-RS is used in a resource block pair, a CSI-RS may have 40 different combinations.

A resource block pair is a resource unit including two resource blocks, and one resource block may be a resource unit that includes 12 subcarriers in the frequency axis and 7 OFDM symbols in the time axis.

Figure 3:
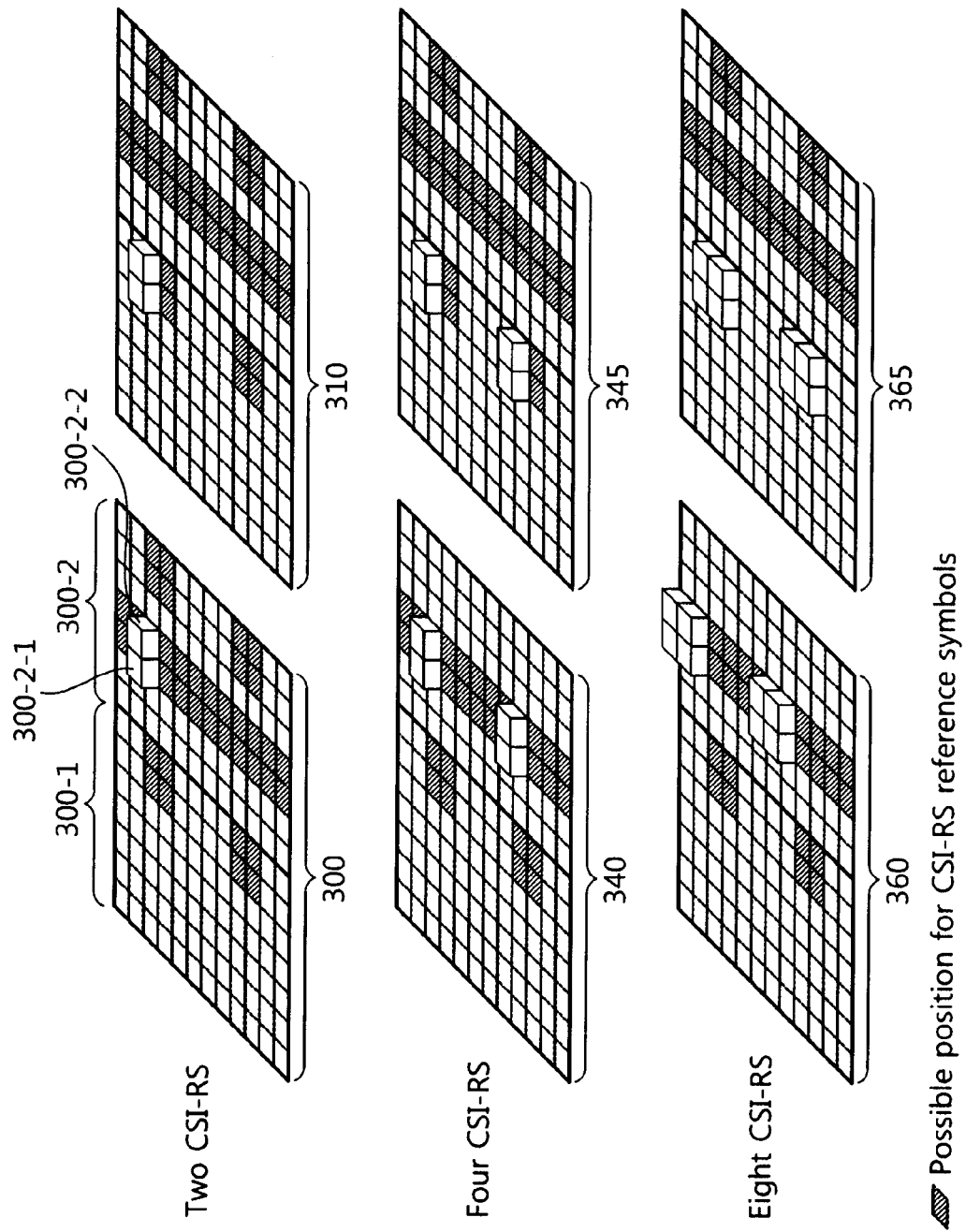
FIG. 3 is a conceptual diagram showing the positions of CSI-RSs in resource block pairs according to the number of CSI-RSs.

FIG. 3 is a conceptual diagram showing the positions of CSI-RSs in resource block pairs according to the number of CSI-RSs.

FIG. 3 shows a case where two CSI-RSs are used in each of resource block pairs 300 and 310. A part indicated by a shadow indicates a part where a CSI-RS may be placed on the resource grid.

For example, two CSI-RSs 300-2-1 and 300-2-2 may be placed in two continuous reference elements in one resource block 300-2 in the time axis. The two CSI-RSs 300-2-1 and 300-2-2 may use respective Orthogonal Cover Codes (OCCs) so that interference is not present between the two CSI-RSs. The two CSI-RSs may be placed in resource elements indicated by shadows. If two CSI-RSs are used in one resource block pair, the resource block pair may have 20 combinations.

FIG. 3 also shows 1) a case where 4 CSI-RSs are used in one resource block pair (340, 345) and 2) a case where 8 CSI-RSs are used in one resource block pair.

If 4 CSI-RSs are used, 10 different CSI-RS structure combinations may be present in a resource block pair. If 8 CSI-RSs are used, 5 different CSI-RS structure combinations may be present in a resource block pair.

If one CSI-RS is used in a resource block pair, the resource block pair may have the same CSI-RS structure as a case where two CSI-RSs are used as in the resource pair blocks 300 and 310 of FIG. 1.

From a viewpoint of a time domain, a cycle in which a CSI-RS is transmitted may be various from 5 ms (every fifth subframe) to 80 ms (every eighth frame). If one CSI-RS is transmitted every 5 ms, overhead generated because the CSI-RS is used may be 0.12%. In order to avoid interference with neighboring cells, a subframe on which the CSI-RS is transmitted may have a value different from that of neighboring cells on the time domain.

FIG. 3 illustrates that CSI-RSs are transmitted in one resource block on a frequency domain, but the CSI-RSs may be transmitted through all cell bandwidths because they can be transmitted in all resource blocks on the frequency domain.

Referring back to FIG. 3, the CSI-RS may be used in the positions of other resource elements not the current position of the CSI-RS as described above. A resource element not used in the CSI-RS, belonging to resource elements corresponding to the positions of such potential CSI-RSs, may be used to send a data symbol.

In another method, however, a resource element corresponding to the position of a potential CSI-RS may be used as a muted CSI-RS (or a zero power CSI-RS). The muted CSI-RS has the same structure as a common CSI-RS structure, but is different from the common CSI-RS structure in that nothing is transmitted in the position of a corresponding resource element.

If a CSI-RS is transmitted in another neighboring cell, the muted CSI-RS of a current cell may become a "transmission hole". The "transmission hole" may be used for the following two purposes.

(1) The transmission hole enables a terminal to receive the CSI-RS of a neighboring cell with no influence on transmission in its cell. The terminal can obtain channel information about a neighboring cell by receiving the CSI-RS of the neighboring cell. The channel information based on the CSI-RS of the neighboring cell can be utilized in multi-cell transmission technology, such as a Cooperative Multi-Point (COMP).

(2) The transmission hole reduces interference with the transmission of a CSI-RS by another cell. In a network in which cells, such as heterogeneous networks, are overlapped with each other, the signal of another cell can be prevented from interfering with a signal transmitted by a current cell because the position of a resource element in which the CSI-RS is transmitted by another cell is removed.

If the CSI-RS of a neighboring cell is to be received as in the case of (1), a muted CSI-RS including a plurality of sets can be used because the muted CSI-RS is used for a CSI-RS set used in a neighboring cell. A muted CSI-RS including one set can be used in order to avoid interference with the CSI-RS of the other cell that is overlapped with one cell as in the case of (2).

Figure 4:
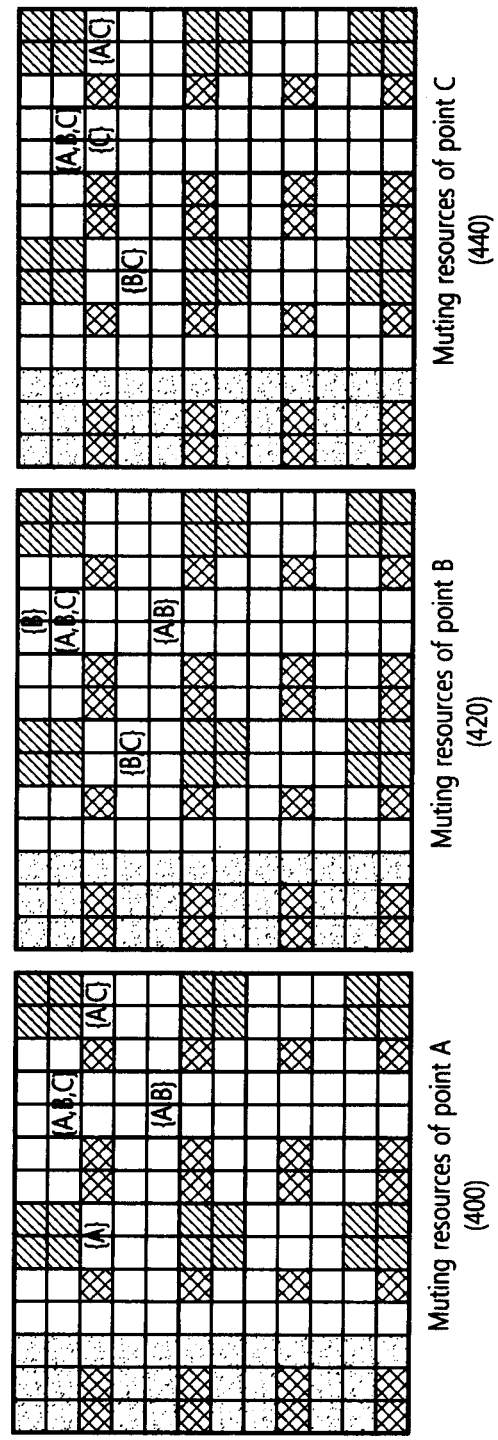
FIG. 4 is a conceptual diagram showing a method of measuring interference based on a muted CSI-RS (zero power CSI-RS).

FIG. 4 is a conceptual diagram showing a method of measuring interference based on a muted CSI-RS (zero power CSI-RS).

In measuring a CQI of pieces of CSI, an accurate modulation and coding level can be determined only when the amount of interference is accurately measured. A method of designating an interference measurement resource region using a muted CSI-RS (zero power CSI-RS) configuration may be used. In this method, a BS designates specific Resource Elements (REs) as REs used in interference measurement for a terminal so that interference is measured in the corresponding REs. For example, 3 nodes {A, B, C} are assumed to be present in a multi-node distributed system. If the node A does not send any signal (performs muting) in the positions of specific REs in which the nodes {B, C} send data, a terminal can measure the amount of interference generated due to the nodes {B, C}. That is, interference generated from the node B and the node C can be measured by enabling a terminal(s) which will receive data from the node A to measure interference in the positions of the corresponding REs.

For example, if three nodes {A, B, C} are present in a cell, four patterns per node may be muted in each of resource block pairs 400, 420, and 440 and interference from adjacent nodes may be measured. In the resource block pairs 400, 420, and 440, a set indicated by parentheses means a serving node set that serves a terminal, and terminals having such a set as a serving node set can measure interference in a corresponding RE position. For example, a terminal that has received data from the nodes A and C can measure interference from the node B by measuring interference in an RE position indicated by a {A, C} position which include the interference from the node B in the resource block 400. Theoretically, in a system including a total of N nodes, a maximum of (2N−1) muting patterns are necessary, and thus a maximum of the (2N−1) patterns need to be muted per node. Muting resource overhead may be increased exponentially as N increases.

In order to apply an interference measurement method based on a zero power CSI-RS as described above, the zero power CSI-RS needs to inform a terminal 1) whether or not corresponding resources are for interference measurement or 2) whether the corresponding resources will reduce interference with adjacent nodes when configuring the zero power CSI-RS.

Figure 5:
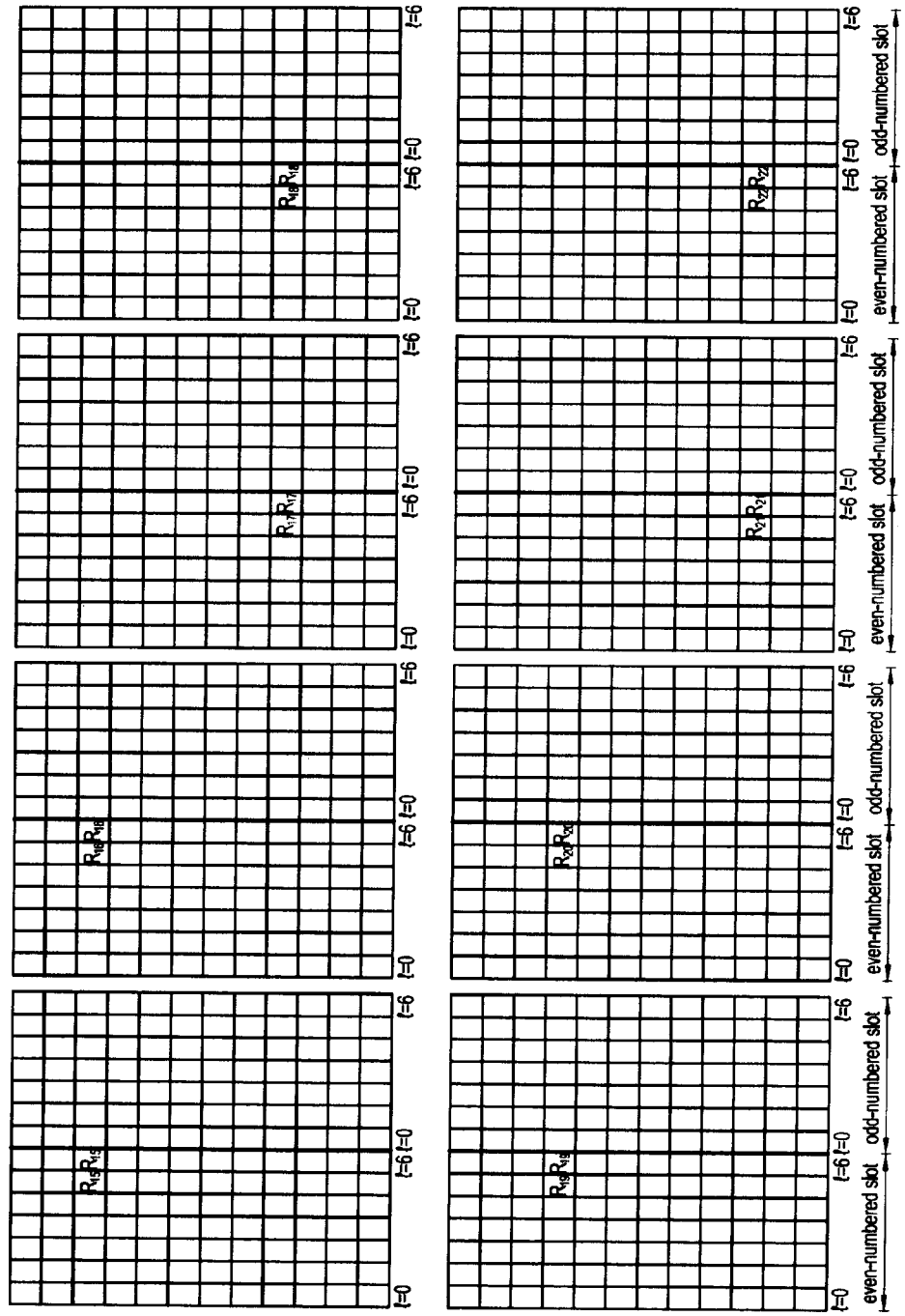
FIG. 5 is a conceptual diagram showing a plurality of structures to which CSI-RSs are mapped in resource block pairs.

FIG. 5 is a conceptual diagram showing a plurality of structures to which CSI-RSs are mapped in resource block pairs.

In the following embodiments, two CSI-RSs are assumed to be included in a resource block pair, for convenience of description, but 1, 4, or 8 CSI-RSs may be included in a resource block pair as described above.

Referring to FIG. 5, in a multi-cell environment, such as an HetNet, a CSI-RS may have a different configuration (or structure) in a resource block pair in order to reduce inter-cell interference.

In a resource block pair, a CSI-RS configuration may be different depending on the number of antenna ports within a cell, and a CSI-RS configuration may be different to a maximum extent between neighboring cells.

Furthermore, a CSI-RS configuration may be classified depending on the type of Cyclic Prefix (CP) within a resource block pair. Furthermore, a CSI-RS configuration may be classified into a case where the CSI-RS configuration is applied to both a frame structure 1 and a frame structure 2 and a case where the CSI-RS configuration is applied to only the frame structure 2 (the frame structure 1 and the frame structure 2 indicate whether a transmission method is Time Division Duplex (TDD) or Frequency Division Duplex (FDD)).

Furthermore, a CSI-RS, unlike a CRS, supports a maximum of 8 ports (p=15, p=15,16, and p=15, . . . , 18, and p=15, . . . , 22) and can be defined for $\Delta f=15$ kHz.

A CSI-RS configuration can be computed according to the following method.

A sequence $r_{l,n_s}(m)$ for a CSI-RS is generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad <\text{Equation 1}>$$

$$m = 0, 1, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1)2 \cdot N_{ID}^{cell} + N_{CP}$$

$$N_{CP} = \begin{cases} 1 & \text{for normal } CP \\ 0 & \text{for extended } CP \end{cases}$$

In the above equation, $n_s$ is a slot number within one radio frame, and l is an OFDM symbol number within a corresponding slot. c(i) is a pseudo random sequence, and a pseudo random sequence is started from each OFDM symbol at $c_{init}$. $N_{ID}^{cell}$ means a physical layer cell ID.

A pseudo-random sequence $r_{l,n_s}(m)$ generated from a seed value based on a cell ID can be resource-mapped to a complexed-valued modulation symbol $a_{k,l}^{(p)}$. Equation 2 below is an equation for mapping a reference signal sequence $r_{l,n_s}(m)$ to a complexed-valued modulation symbol $a_{k,l}^{(p)}$, used as a reference symbol for an antenna port p, in subframes configured to send a CSI-RS.

$$a_{k,l}^{(p)} = w_{l''} \cdot r_{l,n_s}(m') \quad <\text{Equation 2}>$$

where $$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations } 0-19, \\
& \text{normal cyclic prefix} \\
2l'' & \text{CSI reference signal configurations } 20-31, \\
& \text{normal cyclic prefix} \\
l'' & \text{CSI reference signal configurations } 0-27, \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, (k′,l′) and $n_s$ are given in Table 1 and Table 2 to be described later. The CSI-RS can be transmitted in a downlink slot in which (ns mod 2) satisfies the conditions of Table 1 and Table 2.

Table 1 below shows a CSI-RS configuration for a normal CP.

TABLE 1

| | | Number of CSI reference signals configured | | | | | |
|---|---|---|---|---|---|---|---|
| | CSI | 1 or 2 | | 4 | | 8 | |
| | reference signal configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (0, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 below shows a CSI-RS configuration for an extended CP.

TABLE 2

| | | Number of CSI reference signals configured | | | | | |
|---|---|---|---|---|---|---|---|
| | CSI | 1 or 2 | | 4 | | 8 | |
| | reference signal configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |

TABLE 2-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| struc- | 17 | (10, 1) | 1 | (10, 1) | 1 | (10, 1) | 1 |
| ture | 18 | (9, 1) | 1 | (9, 1) | 1 | (9, 1) | 1 |
| type 2 | 19 | (5, 1) | 1 | (5, 1) | 1 | | |
| only | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Multiple CSI-RS configurations may be used in one cell. A non-zero power CSI-RS may use a zero or one configuration, and a zero power CSI-RS may use zero or multiple configurations.

In the case of the zero power CSI-RS, 16 types of 4 ports are indicated by a 16-bit bitmap in Table 1, and multiple configurations may be configured using each bit as '1'. The bitmap is indicated at a ZeroPower CSI-RS of a higher layer. Here, an RE configured as a non-zero power CSI-RS is excluded. The Most Significant Bit (MSB) indicates the lowest CSI-RS configuration index, and bits sequentially indicate configuration indices in ascending powers.

In the following case, a terminal is assumed to have not sent a CSI-RS.

within a special subframe in FS type2, within a subframe in which a CSI-RS collides against synchronization signals, a PBCH, and SystemInformationBlockType1 messages, within a subframe in which a paging message is transmitted, in a set S, that is, s={15}, S={15,16}, S={17,18}, S={19,20} or S={21,22}, a Resource Element (RE) in which the CSI-RS of one antenna port is transmitted is not used to send a PDSCH or the CSI-RS of another antenna port.

The subframe configuration $I_{CSI-RS}$ of a CSI-RS is indicated in a higher layer and informs the subframe configuration and subframe offset value of the CSI-RS as in Table 3.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Table 4 below shows a CSI-RS configuration Information Element (IE).

TABLE 4

```
-- ASN1START
CSI-RS-Config-r10 ::=   SEQUENCE {
        csi-RS-r10              CHOICE {
            release                 NULL,
            setup                   SEQUENCE {
                antennaPortsCount-r10   ENUMERATED {an1, an2, an4, an8},
                resourceConfig-r10      INTEGER (0..31),
                subframeConfig-r1       INTEGER (0..154),
                p-C-r10                 INTEGER (-8..15)
            }
        }                                       OPTIONAL,   -- Need ON
        zeroTxPowerCSI-RS-r10   CHOICE {
            release                 NULL,
            setup                   SEQUENCE {
                zeroTxPowerResourceConfigList-r10   BIT STRING (SIZE (16)),
                zeroTxPowerSubframeConfig-r10       INTEGER (0..154)
            }
        }                                       OPTIONAL,   -- Need ON
}
-- ASN1STOP
```

A CSI-RS configuration IE may include information about antennaPortsCount, resourceConfig, subframeConfig, and p-C-r10, that is, parameters for configuring a CSI-RS that is a reference signal as CSI-RS-Config-r10 information. Furthermore, in the CSI-RS configuration IE, a plurality of parameters may be included in zeroTxPower-RS-r10 as a parameter for configuring a muted CSI-RS (zero power CSI-RS).

That is, the CSI-RS configuration IE may include information about the configuration of a CSI-RS and a zero power CSI-RS.

The parameters included in the configuration IE may include information disclosed in Table 5 below.

TABLE 5

CSI-RS-Config field descriptions antennaPortsCount
Parameter represents the number of antenna ports used for
transmission of CSI reference signals where an1 corresponds
to 1, an2 to 2 antenna ports etc see TS 36 211 [1, 6 10. 5].
p-C
Parameter: $P_c$, see TS 36.213 [2, 7.2.5].
resourceConfig
Parameter: CSI reference signal configuration, see TS 36.211
[1, table 6.10.5.2-1 and 6.10.5.2-2].
subframeConfig
Parameter: $I_{CSI-RS}$, see TS 36.211 [1, table 6.10.5.3-1].
zeroTxPowerResourceConfigList
Parameter: ZeroPowerCSI-RS. see TS 36.211 [1, 6.10.5.2].
zeroTxPowerSubframeConfig
Parameter: $I_{CSI-RS}$, see TS 36.211 [1, table 6.10.5.3-1].

An embodiment of the present invention discloses a method of measuring the amount of interference when the aforementioned CSI-RS is transmitted from a plurality of nodes to a terminal in a multi-node distributed system.

Figure 6:
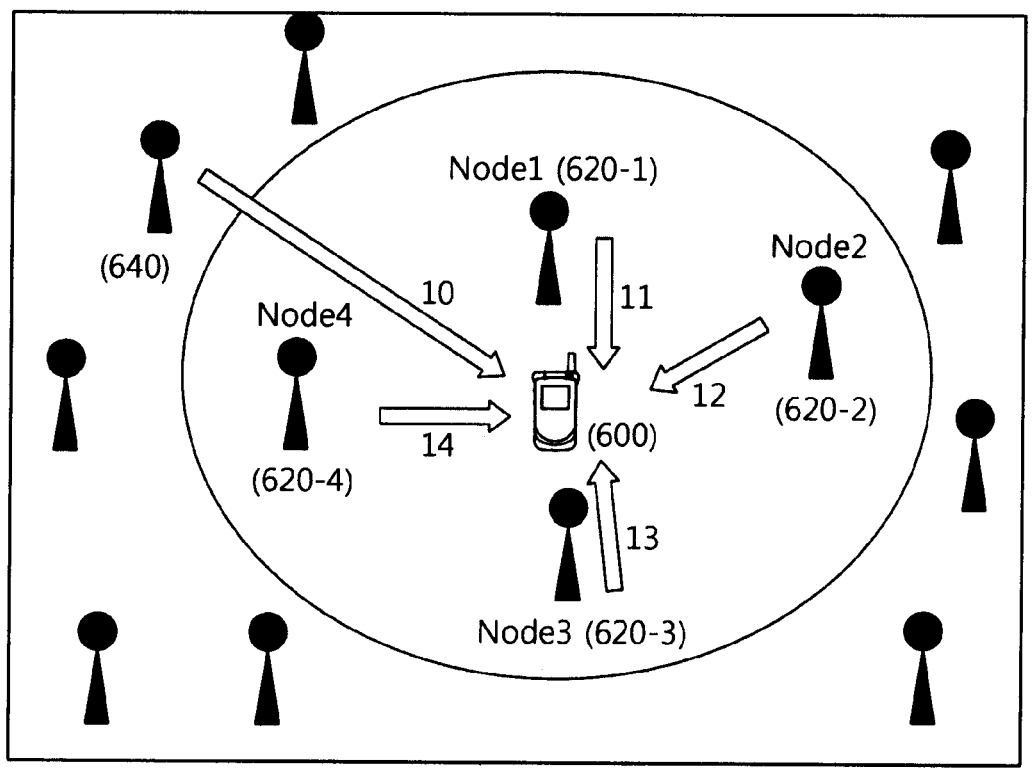
FIG. 6 is a conceptual diagram illustrating a method of measuring the amount of interference using a CSI-RS configuration Information Element (IE) in accordance with an embodiment of the present invention.

FIG. 6 is a conceptual diagram illustrating a method of measuring the amount of interference using a CSI-RS configuration IE in accordance with an embodiment of the present invention.

Hereinafter, in the method of measuring the amount of interference in accordance with an embodiment of the present invention, a terminal may receive a plurality of CSI-RS configuration IEs (a CSI-RS IE or CSI-RS configuration information is also hereinafter used as the same meaning as the CSI-RS configuration IE) for a plurality of nodes. The terminal can measure the amount of interference based on information included in the received CSI-RS IE and can feed back CSI. That is, the amount of interference measured by the terminal can be used to calculate Channel State Information (CSI).

Referring to FIG. 6, a multi-node distributed system may include a terminal 600, a BS or control unit (not shown), a plurality of nodes 620-1, 620-2, 620-3, and 620-4 connected to the BS (or the control unit), and a node 640 of a different BS. In the following embodiment of the present invention, the term 'BS' and the term 'control unit' are parts that control nodes, and they may be used as the same meaning.

The terminal 600 can receive CSI-RS IEs for at least one of the plurality of nodes 620-1, 620-2, 620-3, and 620-4 connected to the BS. For example, it may be assumed that the terminal receives k (k is a natural number) CSI-RS IEs (the first CSI-RS IE, the second CSI-RS IE, . . . , the $k^{th}$ CSI-RS IE), and the CSI-RS IEs received by the terminal 600 can be indexed according to a specific criterion. For example, the CSI-RS IEs may be indexed based on order that the terminal 600 has received the CSI-RS IEs.

In an actual operation, the terminal 600 may receive CSI-RS IEs for at least one node and can feed back CSI in response to the received CSI-RS IEs.

In the following embodiment of the present invention, it is assumed that the terminal 600 has sequentially received the first CSI-RS IE for the node1 620-1, the second CSI-RS IE for the node2 620-2, the third CSI-RS IE for the node3 620-3, and the fourth CSI-RS IE for the node4 620-4 as in FIG. 6, for convenience of description. However, as described above, the terminal 600 may receive only CSI-RS IEs for some nodes, and order that the terminal 600 receives the CSI-RS IE for each node may be different. Even in such a case, the embodiment of the present invention can be likewise applied, and such an embodiment is also included in the scope of the present invention.

Interference that may affect the terminal 600 may include 1) interference from the outside of a node set including at least one node (hereinafter called external interference or called $I_o$) and 2) interference generated from a node that belongs to a node set including at least one node (hereinafter called internal interference or called $I_k$).

The node set may mean a set of non-zero transmission power CSI-RSs of the CSI-RS IEs received by the terminal. That is, by the terminal may classify interference and calculate the external interference and the internal interference based on the CSI-RS IEs received.

For example, when the terminal calculates interference, interference computed using the zero power CSI-RS based on the received CSI-RS IEs may be called the external interference and interference computed using the non-zero power CSI-RS based on the received CSI-RS IEs may be called the internal interference.

In accordance with an embodiment of the present invention, if the terminal 600 computes CSI about the node2 620-2, the terminal may compute 1) the amount of interference in which only the external interference is taken into consideration or 2) CSI based on the amount of interference in which both the external interference and the internal interference are taken into consideration based on the received CSI-RS IEs.

If it is assumed that the terminal computes CSI about the node 2 620-2, the external interference $I_o$ may be computed from RE resource elements for a muted CSI-RS (or also called a zero power CSI-RS) to which the node 1 620-1, the node2 620-2, the node3 620-3, and the node4 620-4 take part. As described above, the zero power CSI-RS is a transmission hole and may be used to measure external energy. For example, the terminal can compute $I_o$, that is, interference from external nodes, based on information about the configuration of the muted CSI-RS (or the zero power CSI-RS).

The external interference $I_o$ may be computed based on CSI-RS IEs for multiple nodes, and one of values may be selected as the external interference $I_o$ or may be transmitted as parameter information in a CSI-RS IE regarding whether or not a muted CSI-RS received from a specific node will be used to measure the external interference. This is described later in connection with an embodiment of the present invention.

In the method of measuring the amount of interference in accordance with an embodiment of the present invention, a method of measuring only the external interference $I_o$ or using both the external interference $I_o$ and the internal interference $I_k$ may be used.

For example, in the case of FIG. 6, the terminal 600 may compute CSI about the node2 620-2 based on the following interference.

1) The external interference $I_o$ or
2) Interference based on the external interference $I_o$ and the internal interference $I_k$ Here, for the internal interference $I_k$, a value calculated based on at least one of $I_1$ that is interference from the node1 620-1, $I_3$ that is interference from the node3 620-3, and $I_4$ that is interference from the node4 620-4, may be used.

The following embodiment of the present invention discloses a method of receiving, by a terminal, information about a Channel State Information-Reference Signal (CSI-RS) configuration, computing the amount of interference based on the CSI-RS configuration information, and sending Channel State Information (CSI) based on the amount of interference.

The CSI-RS configuration information may include at least one of an external interference measurement field including information about a zero power CSI-RS that is used for the terminal to compute external interference and an internal interference measurement field including information about a non-zero power CSI-RS that is used for the terminal to compute internal interference.

The external interference measurement field may include information about a node that sends the zero power CSI-RS used to measure the external interference, and the internal interference measurement field may include information about a node that sends the non-zero power CSI-RS used to measure the internal interference.

Figure 7:
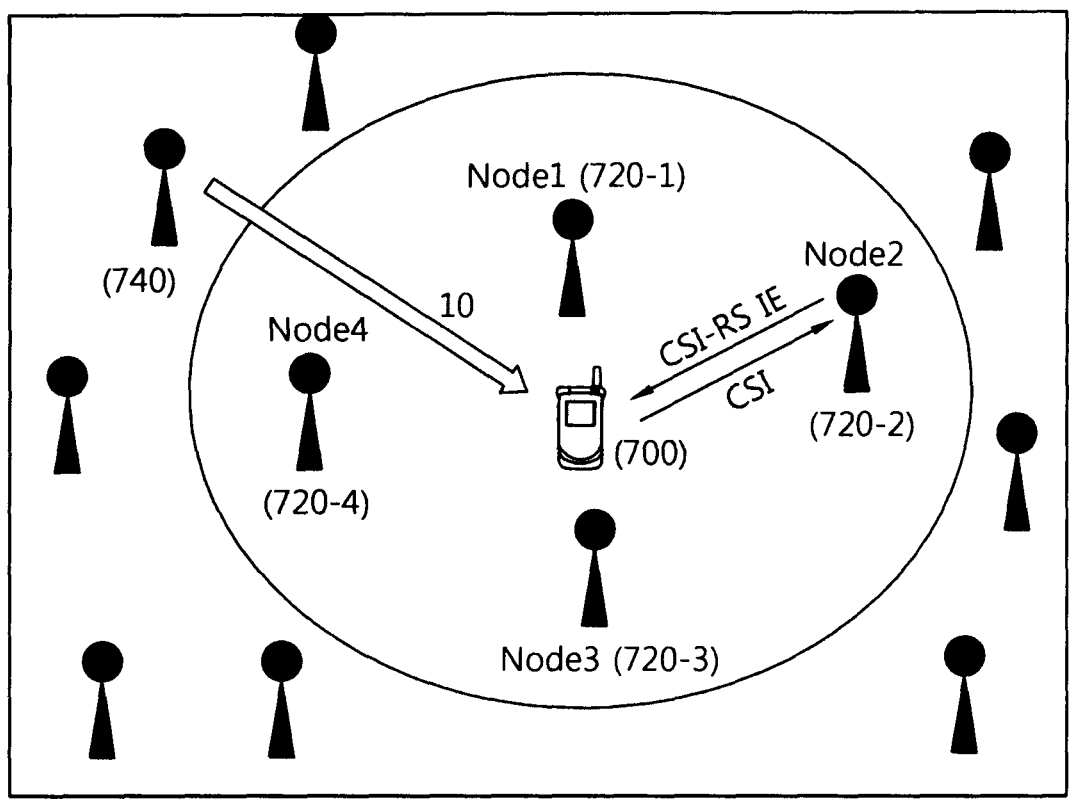
FIG. 7 is a conceptual diagram showing a case where the amount of interference is calculated based on only $I_o$, that is, external interference, in accordance with an embodiment of the present invention.

FIG. 7 is a conceptual diagram showing a case where the amount of interference is calculated based on only $I_o$, that is, external interference, in accordance with an embodiment of the present invention.

In FIG. 7, it is assumed that a terminal 700 computes external interference $I_o$ in order to obtain CSI about a node 2 720-2.

In FIG. 7, it is assumed that the terminal has sequentially received a first CSI-RS IE for a node 1 720-1, a second CSI-RS IE for the node 2 720-2, a third CSI-RS IE for a node 3 720-3, and a fourth CSI-RS IE for a node 4 720-4 as described above, for convenience of description.

In the case of FIG. 7, in order to compute the external interference $I_o$, a zero power CSI-RS computed based on the CSI-RS IE for at least one of the node 1 720-1, the node 2 720-2, the node 3 720-3, the node 4 720-4 may be used. For example, it may be assumed that the zero power CSI-RS of the CSI-RS IE for the node 1 720-1 is used to compute the external interference $I_o$.

That is, the terminal may receive 1) information about a Channel State Information-Reference Signal (CSI-RS) configuration, 2) calculate the amount of interference based on the CSI-RS configuration information, and send Channel State Information (CSI) based on the amount of interference.

The CSI-RS configuration information may include information about a target interference measurement node that informs a target interference measurement node that is used for the terminal to compute interference.

Table 6 below is a table indicating CSI-RS configuration IEs that are newly defined according to an embodiment of the present invention.

1)' may send information regarding whether or not to measure external interference based on what muted CSI-RS (or a zero power CSI-RS is also used as the same meaning) when computing $I_o$. interferenceMeasurementIndication INTEGER(0, 1) may also be called an external interference field.

For example, a zero power CSI-RS included in a CSI-RS IE that is first received, belonging to multiple CSI-RS IEs received to compute the external interference $I_o$, that is, information necessary for the terminal 700 to compute CSI about the node 2 720-2 as in FIG. 7, may be used. In such a case, the interferenceMeasurementIndication of the first received CSI-RS IE means the operation of the terminal. In another embodiment, an indication that instructs information about a zero power CSI-RS included in the CSI-RS IE for the node 1 to be used may be included in the interferenceMeasurementIndication of the CSI-RS IE for the node 2 720-2 in order to compute the external interference $I_o$.

InterferenceMeasurementIndication indicates that which one of pieces of information about multiple zero power CSI-RSs received by the terminal will be used to measure the external interference.

A field 'InterferenceMeasurementIndication' used to measure the external interference is called an external interference measurement field or Outer_Interference. The terminal computes $I_o$ through the RE of a zero power CSI-RS indicated by the field Outer_Interference.

Figure 8:
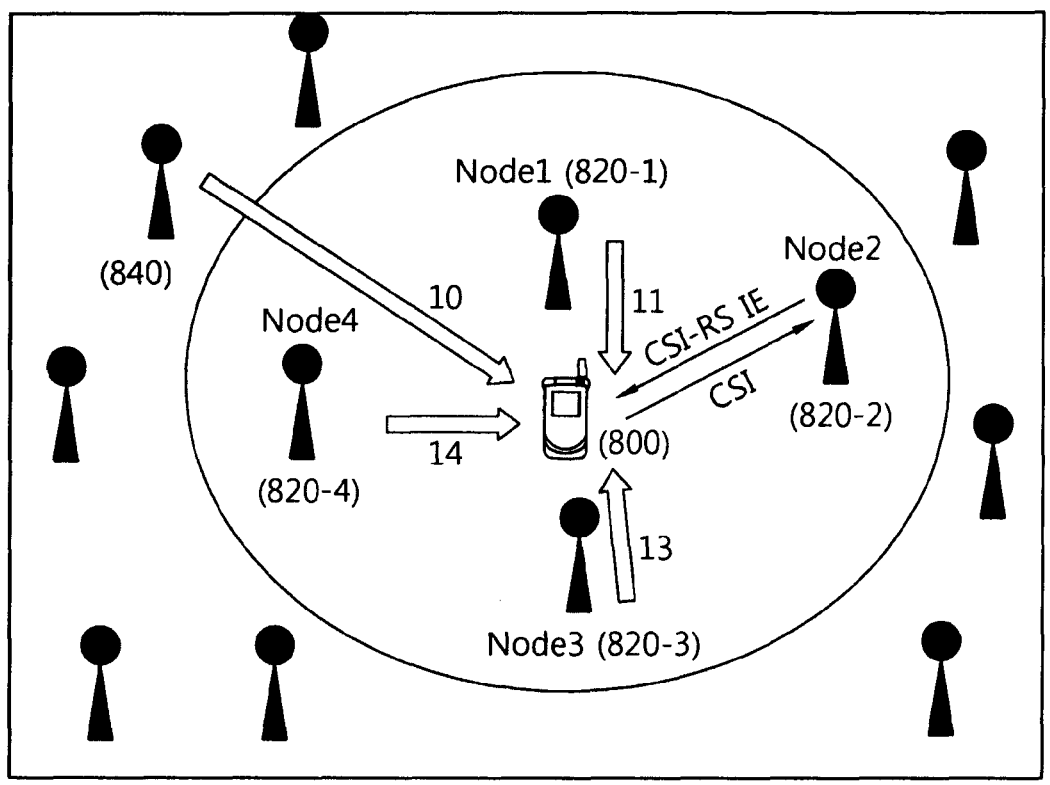
FIG. 8 is a conceptual diagram showing a method of calculating the amount of interference by additionally taking internal interference into consideration in accordance with an embodiment of the present invention.

FIG. 8 is a conceptual diagram showing a method of calculating the amount of interference by additionally taking internal interference into consideration in accordance with an embodiment of the present invention.

In FIG. 8, it is assumed that a terminal 800 computes internal interference in order to compute CSI about a node 2 820-2.

Even in FIG. 8, it is assumed that the terminal has sequentially received a first CSI-RS IE for a node 1 820-1, a second CSI-RS IE for the node 2 820-2, a third CSI-RS IE for a node 3 820-3, and a fourth CSI-RS IE for a node 4 820-4, for convenience of description.

In FIG. 8, in order compute CSI about the node 2 820-2, the terminal 800 may use 1) external interference $I_n$ and 2) inter-

TABLE 6

```
-- ASN1START
CSI-RS-Config-r11::=    SEQUENCE {
        csi-RS-r10           CHOICE {
           release              NULL,
           setup                SEQUENCE {
              antennaPortsCount-r10      ENUMERATED {an1, an2, an4, an8},
              resourceConfig-r10         INTEGER (0..31),
              subframeConfig-r1          INTEGER (0..154),
              p-C-r10                    INTEGER (−8..15)
              }
           }
                                        OPTIONAL,  -- Need ON
        zeroTxPowerCSI-RS-r10   CHOICE {
           release              NULL,
           setup                SEQUENCE {
              zeroTxPowerResourceConfigList-r10   BIT STRING (SIZE (16)),
              zeroTxPowerSubframeConfig-r10       INTEGER (0..154)
              }
           InterferenceMeasurementIndication       INTEGER(0,1)
           }
                                        OPTIONAL   -- Need ON
}
-- ASN1STOP
```

Referring to Table 6, a field InterferenceMeasurementIndication INTEGER(0,1)' may be included in a CSI-RS IE. The field InterferenceMeasurementIndication INTEGER(0, nal interference $I_n$ based on at least one of $I_1$ that is interference from the node 1 820-1, $I_3$ that is interference from the node 3 820-3, and $I_4$ that is interference from the node 4

820-4. The internal interference $I_n$ may be computed using non-zero transmit power CSI-RSs transmitted by the respective nodes.

The external interference $I_n$ may be computed as described above with reference to FIG. 7.

The internal interference $I_k$ may be computed based on the amount of interference from at least one of $I_1$ that is the interference from the node 1 820-1, $I_3$ that is the interference from the node 3 820-3, and $I_4$ that is the interference from the node 4 820-4. A BS 820 may control that the amount of interference computed from what node is measured when computing the internal interference $I_k$.

For example, if a plurality of nodes uses the same CSI-RS configuration or if the transmission of another node is limited when a specific node sends data under the control of the BS 820, the internal interference may be computed by taking only interference from some nodes not interference from all nodes that has been measured by the terminal into consideration.

CSI-RS configuration information (CSI-RS IE) may include information about a target interference measurement node that informs a target interference measurement node that is used for the terminal to compute interference.

Information regarding what interference will be taken into consideration when measuring the internal interference may be included in a newly defined CSI-RS IE. Table 7 below is a table showing the newly defined CSI-RS IE.

has been received in what position will be taken into consideration) may be included in the internal interference measurement field.

For example, the internal interference measurement field may indicate whether or not to take what interference into consideration depending on each bit. If the internal interference measurement field includes four bits 'xxxx', the bits may sequentially mean information regarding whether or not to take $I_1$, $I_2$, $I_3$, and $I_4$ into consideration from the MSB.

The external interference may be computed based on the external interference measurement field disclosed in FIG. 7.

For example, assuming that the internal interference measurement field uses the above expression method, if the internal interference measurement field of the CSI-RS IE for the node 2 820-2 is 1000, $I_1$ that is interference resulting from the node 1 820-1 may be used to compute the internal interference. In order to calculate a total amount of interference, the amount of interference based on the internal interference and the external interference may be calculated by additionally taking the external interference into consideration. The amount of the external interference may be calculated based on the aforementioned method for computing external interference in FIG. 7.

For another example, if the internal interference measurement field of the CSI-RS IE for the node 2 820-2 is 1010, $I_i$ that is interference resulting from the node 1 820-1 and $I_3$ that is interference resulting from the node 3 820-3 may be used to

TABLE 7

```
-- ASN1START
CSI-RS-Config-r11::=   SEQUENCE {
        csi-RS-r10           CHOICE {
            release              NULL,
            setup                SEQUENCE {
                antennaPortsCount-r10    ENUMERATED {an1, an2, an4, an8},
                resourceConfig-r10       INTEGER (0..31),
                subframeConfig-r1        INTEGER (0..154),
                p-C-r10                  INTEGER (-8..15)
            }
        }
    InterferenceMeasurementIndication        BITSTRING(SIZE(N))
                                             OPTIONAL,   -- Need ON
        zeroTxPowerCSI-RS-r10   CHOICE {
            release              NULL,
            setup                SEQUENCE {
                zeroTxPowerResourceConfigList-r10   BIT STRING (SIZE (16)),
                zeroTxPowerSubframeConfig-r10       INTEGER (0..154)
            }
        }
                                             OPTIONAL    -- Need ON
}
-- ASN1STOP
```

Referring to Table 7, interferenceMeasurementIndication BIT STRING(SIZE(N)), that is, a new field, may be included in a CSI-RS IE.

In Table 7, interferenceMeasurementIndication is information for measuring the amount of internal interference and may include information about a non-zero CSI-RS used to measure the internal interference. In Table 7, interferenceMeasurementIndication may also be defined as an internal interference measurement field and may also be called Inner_Interference unlike from the aforementioned Ourter_Interference.

For example, in the case of FIG. 8, internal interference for computing CSI about the node 2 820-2 may be computed. In order to compute the internal interference, information regarding that interference based on what node will be taken into consideration (or interference based on a CSI-RS IE that compute the internal interference. A total amount of interference may be calculated by taking the external interference into consideration additionally.

If the internal interference measurement field uses the aforementioned expression method, $I_2$ corresponding to the second digit in which the CSI-RS IE is transmitted has unlimited 0 in the CSI-RS IE for the node 2 820-2, and thus information about the internal interference may be transmitted using the remaining three bits without a bit indicative of the node 2.

In another embodiment of the present invention, if the internal interference field of the CSI-RS IE for the node 2 820-2 is 0000, it may indicate that internal interference is not measured. In such a case, the amount of interference may be calculated by taking only the external interference $I_o$ into consideration.

In accordance with yet another embodiment of the present invention, FIG. 7 may show information for measuring external interference using the aforementioned external interference measurement field, and FIG. 8 may additionally show information for measuring internal interference using the aforementioned internal interference measurement field. For example, the external interference may be computed from the CSI-RS IE using Outer_Interference or interferenceMeasurementIndication INTEGER(0,1) described in Table 6 that is the external interference measurement field, and the internal interference may be computed using Inner_Interference or interferenceMeasurementIndication BIT STRING(SIZE(N)) described in Table 7 that is the internal interference measurement field. Such an embodiment is also included in the scope of the present invention.

Figure 9:
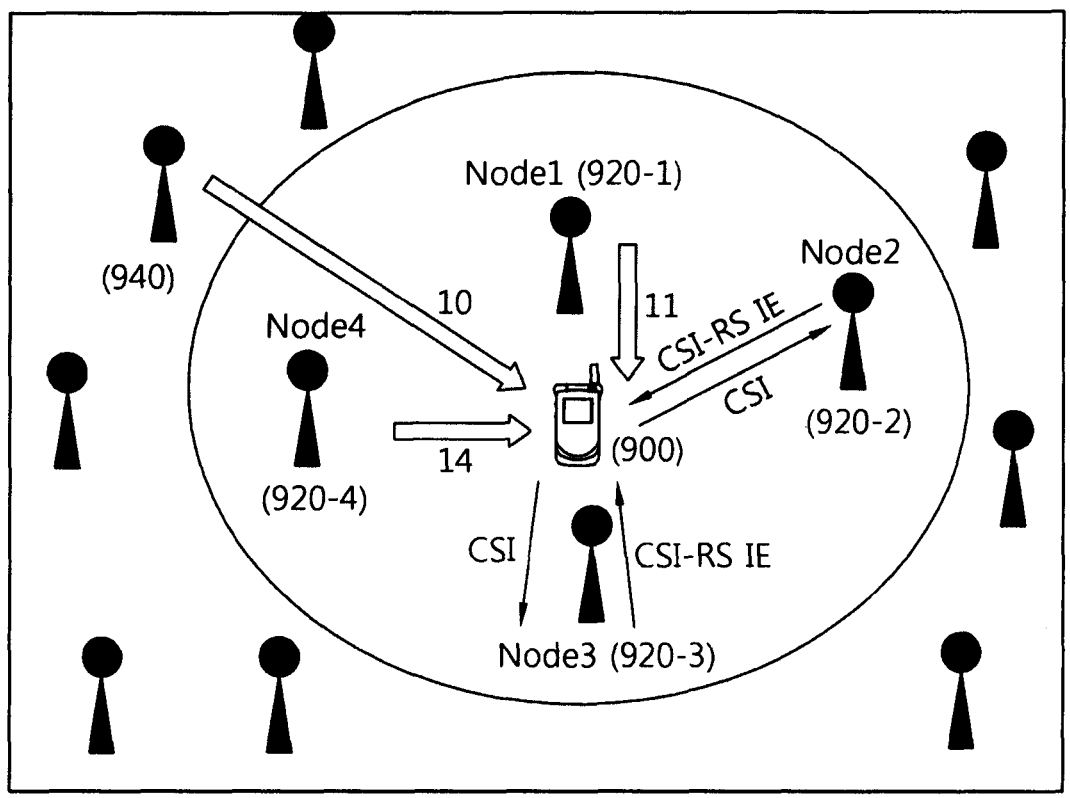
FIG. 9 is a conceptual diagram showing a case where a terminal receives data from a plurality of nodes in accordance with an embodiment of the present invention.

FIG. 9 is a conceptual diagram showing a case where a terminal receives data from a plurality of nodes in accordance with an embodiment of the present invention.

For example, if a BS uses a cooperative data transmission method, such as Cooperative Multi-Point (CoMP), data may be transmitted from two nodes to a terminal.

Referring to FIG. 9, assuming that a node 2 920-2 and a node 3 920-3 send data using CoMP, a CSI-RS IE for at least one of the node 2 920-2 and the node 3 920-3 may be transmitted to a terminal. The CSI-RS IE received by the terminal may include an interference measurement field. If the interference measurement field uses the same method as that described with reference to FIG. 9, the interference measurement field may include 'x00x' of 4 bits or 'xx', that is, 2-bit information, other than '00' as a bit string in order to indicate information regarding whether or not to measure internal interference from at least one of the node 1 920-1 and the node 4 920-4.

Furthermore, the CSI-RS IE received by the terminal may include the external interference measurement field and include information regarding whether or not to measure external interference from what zero power CSI-RS.

Figure 10:
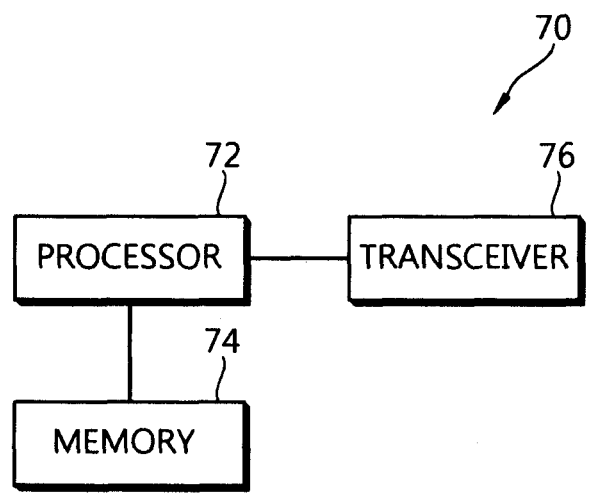
FIG. 10 is a block diagram showing a wireless apparatus to which an embodiment of the present invention can be applied.

FIG. 10 is a block diagram showing a wireless apparatus to which an embodiment of the present invention can be applied.

The wireless apparatus 70 is a terminal capable of implementing the aforementioned embodiments and may be an AP or a non-AP station (STA).

The wireless apparatus 70 includes a processor 72, memory 74, and a transceiver 76. The transceiver 76 transmits/receives radio signals, and the physical layer of IEEE 802.11 is implemented in the transceiver 76. The processor 72 is functionally connected to the transceiver 76 and implements the MAC layer and physical layer of IEEE 802.11. The processor 72 may generate a CSI-RS-Config information element in accordance with an embodiment of the present invention or may analyze a received CSI-RS-Config information element and perform interference measurement. That is, the processor 72 may be configured to implement the aforementioned embodiments of the present invention. The transceiver 76 can send or receive the generated CSI-RS-Config information element.

The processor 72 and/or the transceiver 76 may include Application-Specific Integrated Circuits (ASICs), other chipsets, logic circuits and/or data processors. The memory 74 may include Read-Only Memory (ROM), Random Access Memory (RAM), flash memory, memory cards, storage media and/or other storage devices. When an embodiment is implemented in software, the aforementioned scheme may be implemented as a module (process or function) that performs the aforementioned function. The module may be stored in the memory 74 and executed by the processor 72. The memory 74 may be placed inside or outside the processor 72 and may be connected to the processor 72 using a variety of well-known means.

The invention claimed is:

1. A method of measuring a channel state in a multi-node distributed system, the method comprising:
   receiving, by a user equipment (UE), Channel State Information-Reference Signal (CSI-RS) configuration information from a node, wherein the node is one of a plurality of nodes that make up a node set in the multi-node distributed system; and
   determining, by the UE, internal interference and external interference; and
   transmitting Channel State Information (CSI) based on the internal interference and the external interference to the node,
   wherein the CSI-RS configuration information includes an internal interference measurement field and an external interference field,
   wherein the internal interference field includes information related to at least one first node among the plurality of nodes,
   wherein the at least one first node transmits a non-zero power CSI-RS to determine internal interference in the node set,
   wherein the external interference field includes information related to a second node among the plurality of nodes,
   wherein the second node transmits a zero power CSI-RS to determine external interference in the node set,
   wherein the UE computes the external interference based on the zero-power CSI-RS and the internal interference based on the non-zero-power CSI-RS, and wherein the zero power CSI-RS is a CSI-RS in which an energy value of a resource element is 0.

2. The method of claim 1, wherein the internal interference is generated by the plurality of nodes, and wherein the external interference is generated by at least one node not among the plurality of nodes.

3. The method of claim 1, wherein the internal interference field includes a bitmap, wherein the bitmap indicates the at least one first node among the plurality of nodes.

4. The method of claim 1, further comprising: receiving, by the UE, another CSI-RS configuration information from another node among the plurality of nodes; and determining, by the UE, another internal interference and another external interference based on the another CSI-RS configuration information; and transmitting CSI based on the another internal interference and the another external interference to the another node, wherein the another CSI-RS configuration information includes another internal interference measurement field and another external interference field, wherein the another internal interference field includes information related to at least one third node among the plurality of nodes, wherein the at least one third node transmits a non-zero power CSI-RS to determine the another internal interference, wherein the external interference field includes information related to an a forth node among the plurality of nodes, and wherein the fourth node transmits a zero power CSI-RS to determine the another external interference.

5. A user equipment (UE) configured to measure a channel state in a multi-node distributed system, the UE comprising:
   a radio frequency (RF) unit configured to transmit or receive a radio signal; and
   a processor operatively connected to the RF unit and configured to:

receive Channel State Information-Reference Signal (CSI-RS) configuration information from a node, wherein the node is one of a plurality of nodes that make up a node set in the multi-node distributed system, determine internal interference and external interference, and transmit Channel State Information (CSI) based on the internal interference and the external interference to the node, wherein the CSI-RS configuration information includes an internal interference measurement field and an external interference field, wherein the internal interference field includes information related to at least one first node among the plurality of nodes, wherein the at least one first node transmits a non-zero power CSI-RS to determine internal interference in the node set, wherein the external interference field includes information related to a second node among the plurality of nodes, wherein the second node transmits a zero power CSI-RS to determine external interference included in the node set, wherein the UE computes the external interference based on the zero-power CSI-RS and the internal interference based on the non-zero-power CSI-RS, and wherein the zero power CSI-RS is a CSI-RS in which an energy value of a resource element is 0.

6. The UE of claim 5, wherein the internal interference is generated by the plurality of nodes, and wherein the external interference is generated by at least one node not among the plurality of nodes.

7. The UE of claim 5, wherein the internal interference field includes a bitmap, wherein the bitmap indicates the at least one first node among the plurality of nodes.

8. The UE of claim 5, wherein the processor is configured to: receive another CSI-RS configuration information from another node included in the node set; and determine another internal interference and another external interference based on the another CSI-RS configuration information, and transmit another CSI based on the another internal interference and the another external interference to the another node, wherein the another CSI-RS configuration information includes another internal interference measurement field and another external interference field, wherein the another internal interference field includes information related to at least one third node among the plurality of nodes, wherein the at least one third node transmits a non-zero power CSI-RS to determine the another internal interference, wherein the external interference field includes information related to an a forth node among the plurality of nodes, and wherein the fourth node transmits a zero power CSI-RS to determine the another external interference.

* * * * *